US008081299B2

United States Patent
Kim et al.

(10) Patent No.: US 8,081,299 B2
(45) Date of Patent: Dec. 20, 2011

(54) DISTANCE MEASURING APPARATUS

(75) Inventors: Hong Ki Kim, Gyunggi-do (KR); Joo Hong Kim, Gyunggi-do (KR); Dong Ik Shin, Gyunggi-do (KR); Jung Eun Noh, Gyunggi-do (KR); Back Kue Lee, Gyunggi-do (KR); Boris Kirillov, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 168 days.

(21) Appl. No.: 12/555,980

(22) Filed: Sep. 9, 2009

(65) Prior Publication Data
US 2010/0245799 A1 Sep. 30, 2010

(30) Foreign Application Priority Data
Mar. 25, 2009 (KR) .................... 10-2009-0025316

(51) Int. Cl.
*G01C 3/08* (2006.01)
(52) U.S. Cl. .................... 356/4.01; 356/3.01; 356/3.15; 356/4.1
(58) Field of Classification Search ........ 356/3.01–28.5, 356/4.01–4.1, 5.01–5.15, 6–22, 28
See application file for complete search history.

(56) References Cited

U.S. PATENT DOCUMENTS

| 5,055,683 | A | * | 10/1991 | McCracken | 250/334 |
| 5,337,189 | A | * | 8/1994 | Krawczyk et al. | 359/850 |
| 7,746,449 | B2 | * | 6/2010 | Ray et al. | 356/5.01 |
| 7,894,044 | B1 | * | 2/2011 | Sullivan | 356/4.01 |
| 2005/0237511 | A1 | * | 10/2005 | Takahashi et al. | 356/121 |

FOREIGN PATENT DOCUMENTS
JP 10-020035 1/1998
* cited by examiner

*Primary Examiner* — Thomas Tarcza
*Assistant Examiner* — Luke Ratcliffe
(74) *Attorney, Agent, or Firm* — McDermott Will & Emery LLP (57) ABSTRACT

A distance measuring apparatus according to an aspect of the invention may include: a light source irradiating reference light to measure a distance; a lower reflective mirror reflecting the reference light to irradiate the reference light onto a peripheral obstacle, and reflecting reflected light, rebounded from an obstacle, so that the reflected light moves in an opposite direction along the same optical path as the reference light; a sensor lens arranged above the lower reflective mirror, converting the reference light into parallel light beams and focusing the reflected light; an upper reflective mirror arranged above the sensor lens and switching an optical path of the reflected light; and an optical sensor receiving the reflected light having the optical path thereof switched by the upper reflective mirror, wherein the upper reflective mirror reflects back the reflected light, focused after passing through the sensor lens, in an opposite direction to a moving direction thereof so that a focus of the reflected light is formed between the lower reflective mirror and the upper reflective mirror.

15 Claims, 8 Drawing Sheets

DISTANCE MEASURING APPARATUS

CROSS-REFERENCE TO RELATED APPLICATIONS

This application claims the priority of Korean Patent Application No. 10-2009-0025316 filed on Mar. 25, 2009, in the Korean Intellectual Property Office, the disclosure of which is incorporated herein by reference.

BACKGROUND OF THE INVENTION

1. Field of the Invention

The present invention relates to a distance measuring apparatus, and more particularly, to a distance measuring apparatus that measures a distance to an object on the basis of the time it takes for light, emitted from a light source, to be reflected off the object and be received by the apparatus.

2. Description of the Related Art

In general, a distance measuring apparatus that measures a distance to an object using light, such as laser light, performs the measurement using the time-of-flight (TOF) technique and a position sensitive device (PSD) utilizing the difference in angle of light that is reflected off a local object and a remote object.

The time-of-flight (TOF) method is used to measure a distance by detecting the difference between the time at which a light source emits reference light and a time at which an optical sensor detects the reflected light of the reference light, rebounded from a measured object.

According to the related art, a distance measuring apparatus using light is provided in such a manner that a direction of reference light, emitted from a light source, is orthogonal to a direction of the reflected reference light, rebounded from a measured object and being made incident on an optical sensor.

For example, the distance measuring apparatus according to the related art may include a light source, a first mirror, a second mirror and an optical sensor. The first mirror changes the path of reference light, emitted from the light source, to a perpendicular direction. The second mirror changes the path of the reference light, whose path has been changed by the first mirror, toward the measured object, receives reflected reference light, reflected from the measured object, and changes the path of the reflected light toward the first mirror. The optical sensor receives the reflected light having its path changed by the second mirror. The first mirror may be provided between the optical sensor and the second mirror.

In the configuration of the distance measuring apparatus according to the related art, the reference light, emitted from the light source, and the reflected light, received by the optical sensor, move in difference directions. Therefore, optical paths having predetermined lengths are required to ensure a sufficient distance to focus light on the left, right, top and bottom, which causes an increase in the size of the distance measuring apparatus.

SUMMARY OF THE INVENTION

An aspect of the present invention provides a distance measuring apparatus that can reduce the size thereof through a configuration in which reflected light moves back and forth with limited space of an optical path by switching the optical path of the reflected light.

According to an aspect of the present invention, there is provided a distance measuring apparatus including: a light source irradiating reference light to measure a distance; a lower reflective mirror reflecting the reference light to irradiate the reference light onto a peripheral obstacle, and reflecting reflected light, rebounded from an obstacle, so that the reflected light moves in an opposite direction along the same optical path as the reference light; an upper reflective mirror arranged above the sensor lens and switching an optical path of the reflected light; and an optical sensor receiving the reflected light having its optical path switched by the upper reflective mirror, wherein the upper reflective mirror reflects back the reflected light, focused after passing through the sensor lens, in an opposite direction to a moving direction thereof so that a focus of the reflected light is formed between the lower reflective mirror and the upper reflective mirror.

The upper reflective mirror, the sensor lens and the lower reflective mirror may be aligned along the same optical axis as the reference light and the reflected light.

The light source and the optical sensor may be located between the sensor lens and the upper reflective mirror and be aligned along the same optical axis as the upper reflective mirror and the sensor lens.

The optical sensor may be located, at a position where the reflected light is focused, along the optical path.

The light source and the optical sensor may face each other on the basis of the optical path so that an optical axis between the light source and the optical sensor is orthogonal to the optical axis between the lower reflective mirror and the upper reflective mirror.

The distance measuring apparatus may further include a path switching unit switching the optical path of the reflected light, emitted from the light source, toward the optical axis and switching the optical path of the reflected light, reflected by the upper reflective mirror, toward the optical sensor.

The path switching unit may be secured to an upper surface of the sensor lens along the optical axis and be aligned along the same optical axis as the light source and the optical sensor.

The path switching unit may include a prism having a reflective surface inclined to the upper surface of the sensor lens.

The reflective surface may include an inner mirror surface reflecting the reference light, emitted from the light source, to the lower reflective mirror and an outer mirror surface reflecting rebounded light, reflected by the upper reflective mirror, to the optical sensor.

The path switching unit may include a two-way mirror having mirror surfaces on both sides thereof, and be inclined at a predetermined slope with respect to the upper surface of the sensor lens.

The two-way mirror may include one surface reflecting the reference light, emitted from the light source, to the lower reflective mirror, and the other surface reflecting the reflected light, reflected by the upper reflective mirror, to the optical sensor.

The two-way mirror may include one surface reflecting the reference light, emitted from the light source, to the lower reflective mirror, and the other surface reflecting the reflected light, reflected by the upper reflective mirror, to the optical sensor.

The path switching unit may include a pair of optical fibers guiding the reference light, emitted from the light source, toward the lower reflective mirror and guiding the reflected light, reflected by the upper reflective mirror, toward the optical sensor.

The lower reflective mirror may rotate on a rotary axis and tilts in connection with the rotary shaft by a hinge.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
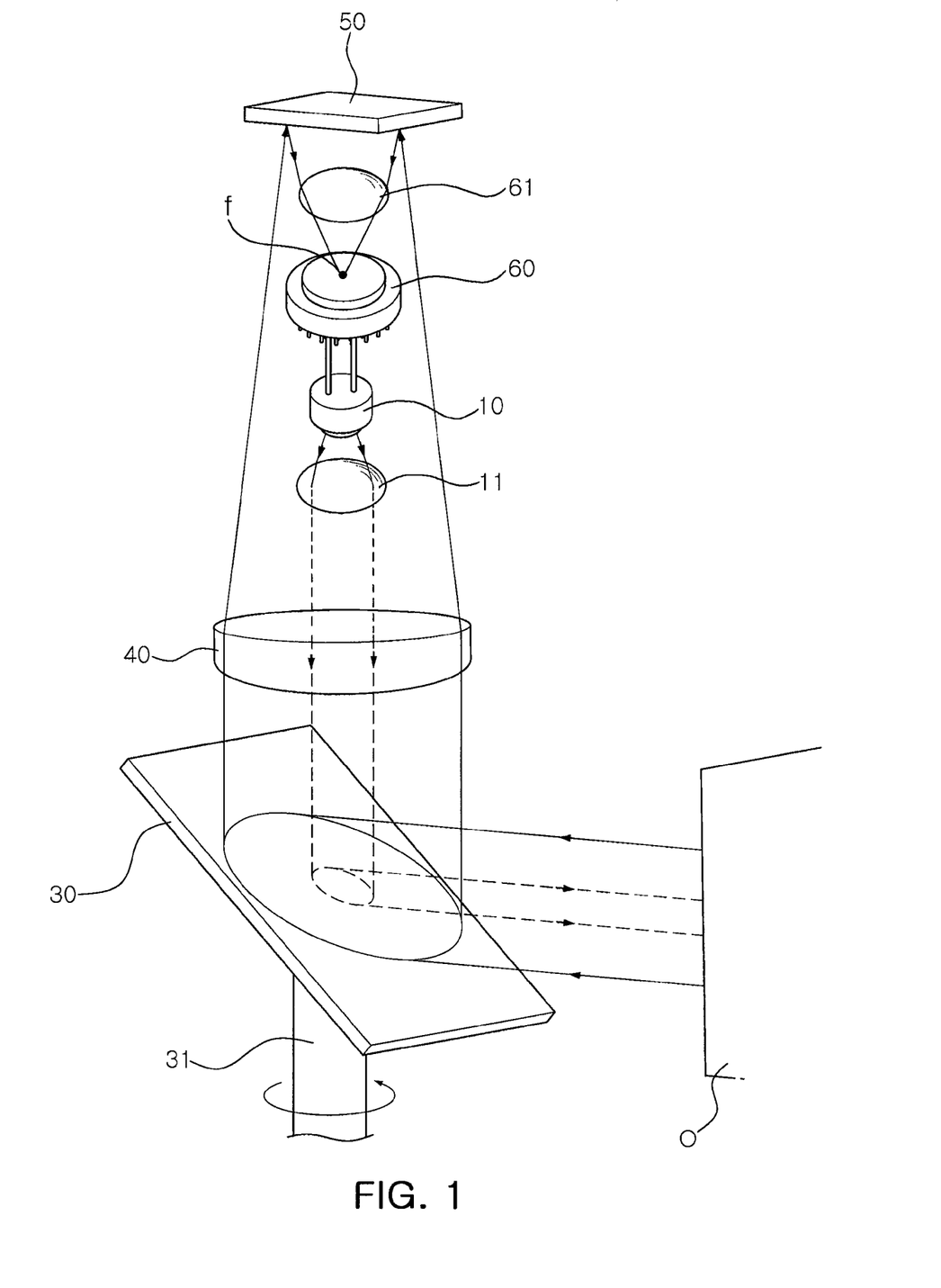
FIG. 1 is a perspective view schematically illustrating a distance measuring apparatus according to an exemplary embodiment of the present invention.
Figure 2:
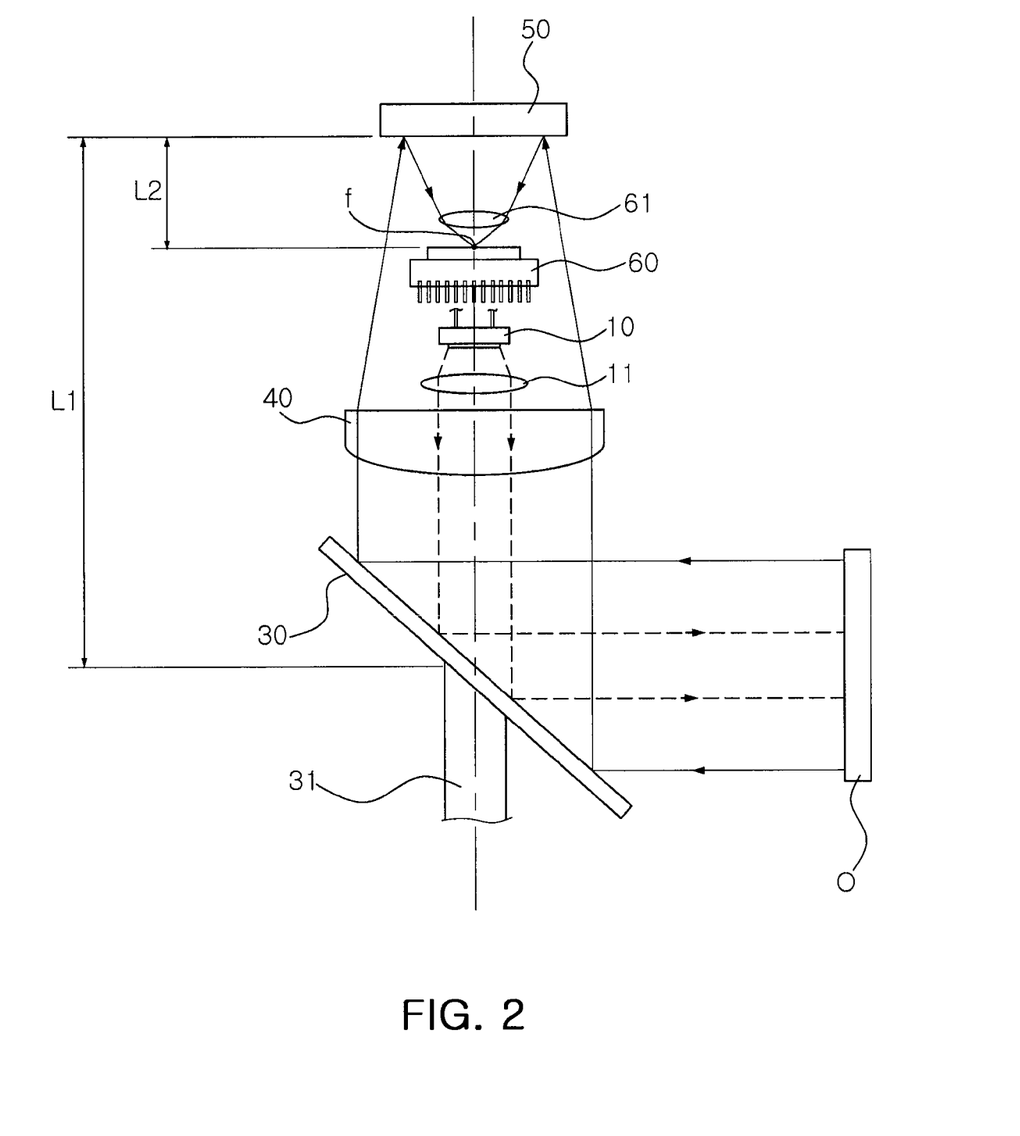
FIG. 2 is a cross-sectional view illustrating the distance measuring apparatus, shown in FIG. 1.
Figure 3:
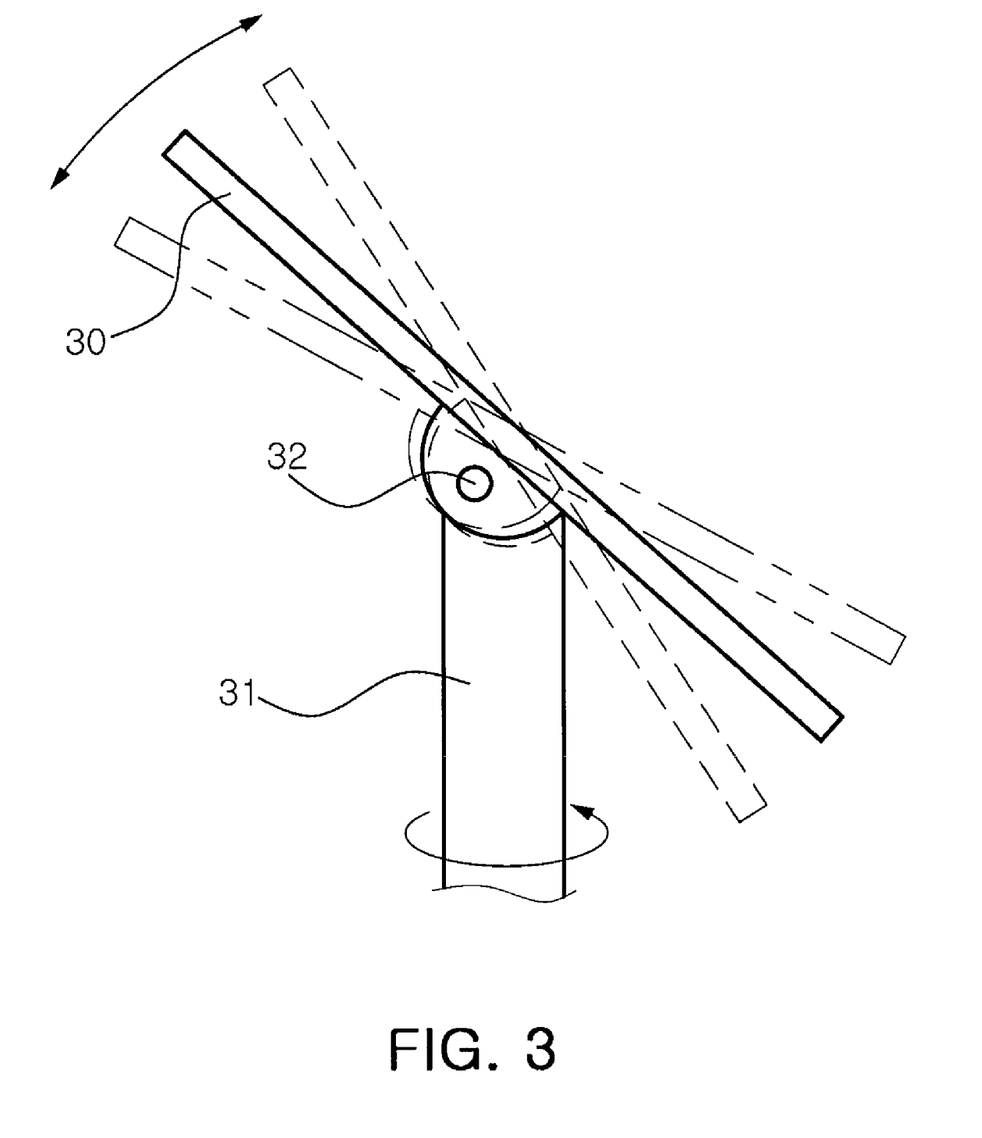
FIG. 3 is an enlarged cross-sectional view illustrating a rotary reflection unit of the distance measuring apparatus shown in FIG. 1.

FIG. 1 is a perspective view schematically illustrating a distance measuring apparatus according to an exemplary embodiment of the invention. FIG. 2 is a cross-sectional view illustrating the distance measuring apparatus, shown in FIG. 1. FIG. 3 is an enlarged cross-sectional view illustrating a rotary reflection unit of the distance measuring apparatus shown in FIG. 1.

As shown in FIGS. 1 through 3, a distance measuring apparatus according to this embodiment includes a light source 10, a lower reflective mirror 30, a sensor lens 40, an upper reflective mirror 50 and an optical sensor 60.

The light source 10 generates and irradiates reference light to measure the distance to a peripheral obstacle O. Preferably, the light source 10 is a pulse laser diode that emits short-wavelength laser beams in order to measure the time it takes light to travel. However, a light emitting diode (LED) may also be used.

A collimation lens 11 may be arranged in front of the light source 10 in order to convert the reference light into parallel light beams.

The collimation lens 11 may include at least one spherical or aspherical surface. Anti-reflective coatings may be applied to the surface of the collimation lens 11 to reduce light reflection.

The reference light, having passed through the collimation lens 11, moves in parallel along an optical path with a predetermined range.

The lower reflective mirror 30 reflects the reference light on the move and irradiates the reflected reference light onto the peripheral obstacle O. Then, the lower reflective mirror 30 reflects back rebounded reference light, reflected from the peripheral obstacle O, so that the reflected light moves along the same optical path as that of the reference light.

That is, the reference light is reflected from the peripheral obstacle O. The lower reflective mirror 30 causes the rebounded reference light to move along an optical path, which is the same as the optical path of the reference light, toward the optical sensor 60 that receives the reflected light.

The lower reflective mirror 30 may be fixed and be inclined at a slope of 45 degrees. As shown in FIG. 3, the lower reflective mirror 30 may rotate with a rotary shaft 31 that rotates around an optical axis in a vertical direction or may tilt in connection with the rotary shaft 31 through a hinge shaft 32.

In this way, reference light, such as a laser beam, is irradiated in a vertical direction as well as a horizontal direction to perform three-dimensional scanning, so that three-dimensional spatial data can be obtained by detecting the distance to the peripheral object.

The reflective surface of the lower reflective mirror 30 may be coated with metals, such as gold, silver and aluminum, or dielectric materials.

The sensor lens 40 is arranged above the lower reflective mirror 30. Further, the sensor lens 40 converts the reference light into parallel light beams and focuses the reflected light so that the optical sensor 60 can detect the reflected light.

As shown in the drawings, the sensor lens 40 has a planar upper surface that the reference light enters and a convex lower surface that faces the lower reflective mirror 30.

Alternatively, the upper and lower surfaces both may be convex surfaces, and at least one surface thereof may be a spherical or aspherical surface.

Preferably, anti-reflective coatings are applied to the surface of the sensor lens 40 to thereby reduce light reflection.

The upper reflective mirror 50 is arranged above the sensor lens 40 so as to switch the optical path of the reflected light.

As shown in the drawings, the reflective surface of the upper reflective mirror 50 is perpendicular to the optical axis of the reference light and the reflected light and faces the lower reflective mirror 30.

Therefore, the upper reflective mirror 50 reflects back the rebounded light, focused after passing through the sensor lens 40, in an opposite direction to the direction in which the reflected light travels, so that a focus f of the reflected light is located on the optical path formed between the lower reflective mirror 30 and the upper reflective mirror 50.

That is, the upper reflective mirror 50 limits the optical path of the reflected light to the space between the lower reflective mirror 30 and the upper reflective mirror 50, which corresponds to L1. A distance corresponding to L2 between the upper reflective mirror 50 and the focus f from the entire distance in which the reflected light, focused through the sensor lens 40 and forming the focus f, is included in the optical path since the reflected light is reflected by the upper reflective mirror 50.

Here, the reflected light moves back and forth a distance corresponding to the distance L2 within the limited space of the optical path. The distance at which the reflected light is focused, which determines the size (in a vertical direction) of the distance measuring apparatus, may be limited within the optical path.

Therefore, the position of the upper reflective mirror 50 is controlled to shorten or extend the optical path to thereby reduce the size of the distance measuring apparatus, and further facilitate the design of the distance measuring apparatus in various sizes.

As shown in the drawings, the upper reflective mirror 50, the sensor lens 40 and the lower reflective mirror 30 are aligned along the same optical axis as the reference light and the reflected light, such that the reflected light moves back and forth along the optical path.

The optical sensor 60 receives the reflected light, having its optical path switched by the upper reflective mirror 50, and measures the distance to the peripheral obstacle O.

The optical sensor 60 may be a photo diode or an Avalanche photodiode (APD). A condenser lens 61 may be disposed in front of the optical sensor so as to receive the reflected light.

The condenser lens 61 may have at least one spherical or aspherical surface, and anti-reflective coatings may be applied to the surface thereof to reduce light reflection.

As shown in the drawings, while the optical sensor 60 is arranged above the light source 10, the light source and the optical sensor 60 are arranged between the sensor lens 40 and the upper reflective mirror 50.

At this time, the light source 10 and the optical sensor 60 may be aligned on the same optical axis as the upper reflective mirror 50, the sensor lens 40 and the lower reflective mirror 30.

The optical sensor 60 is arranged at a position where the reflected light forms the focus f along the optical path, and receives the focused reflected light.

The reflected light, reflected by the upper reflective mirror 50 after passing through the sensor lens 40, is focused onto the optical sensor 60 and converted into a signal used to measure the distance. The signal is transmitted to an operation unit (not shown) that is connected to the optical sensor 60.

A distance measuring apparatus according to another exemplary embodiment of the invention will be described with reference to FIGS. 4 through 8.

Figure 4:
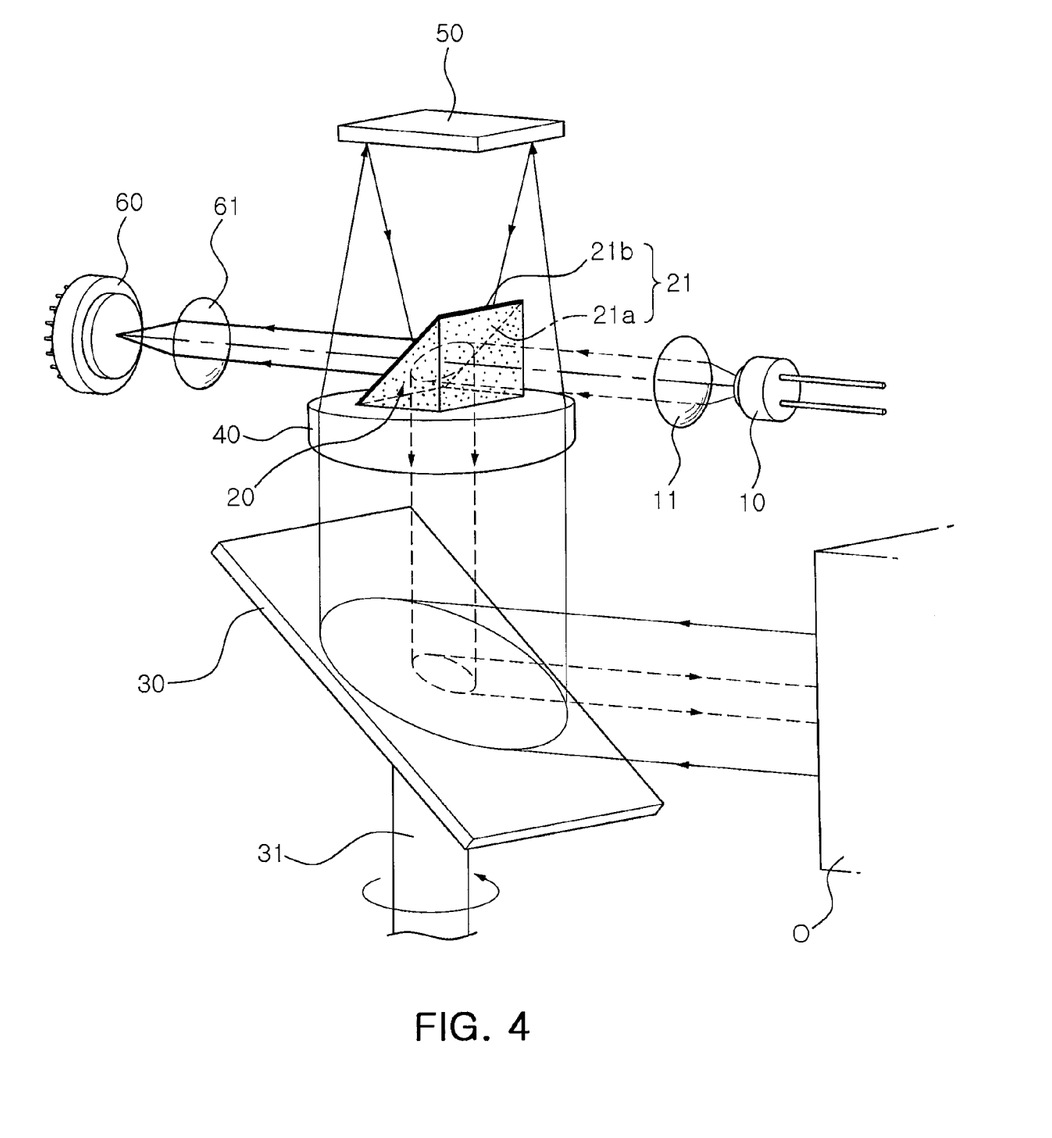
FIG. 4 is a perspective view schematically illustrating a distance measuring apparatus according to another exemplary embodiment of the present invention.
Figure 5:
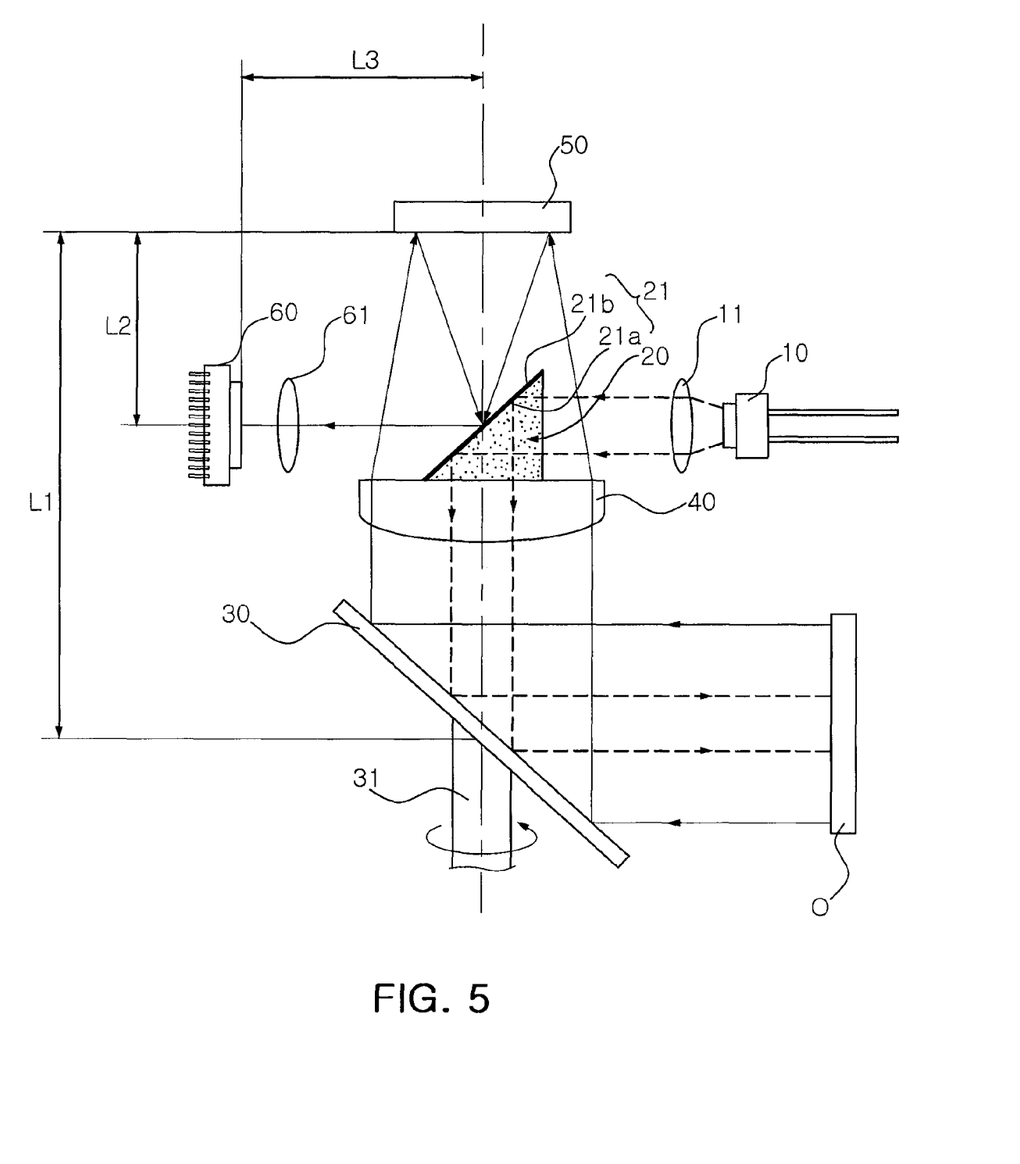
FIG. 5 is a cross-sectional view illustrating the distance measuring apparatus, shown in FIG. 4.
Figure 6:
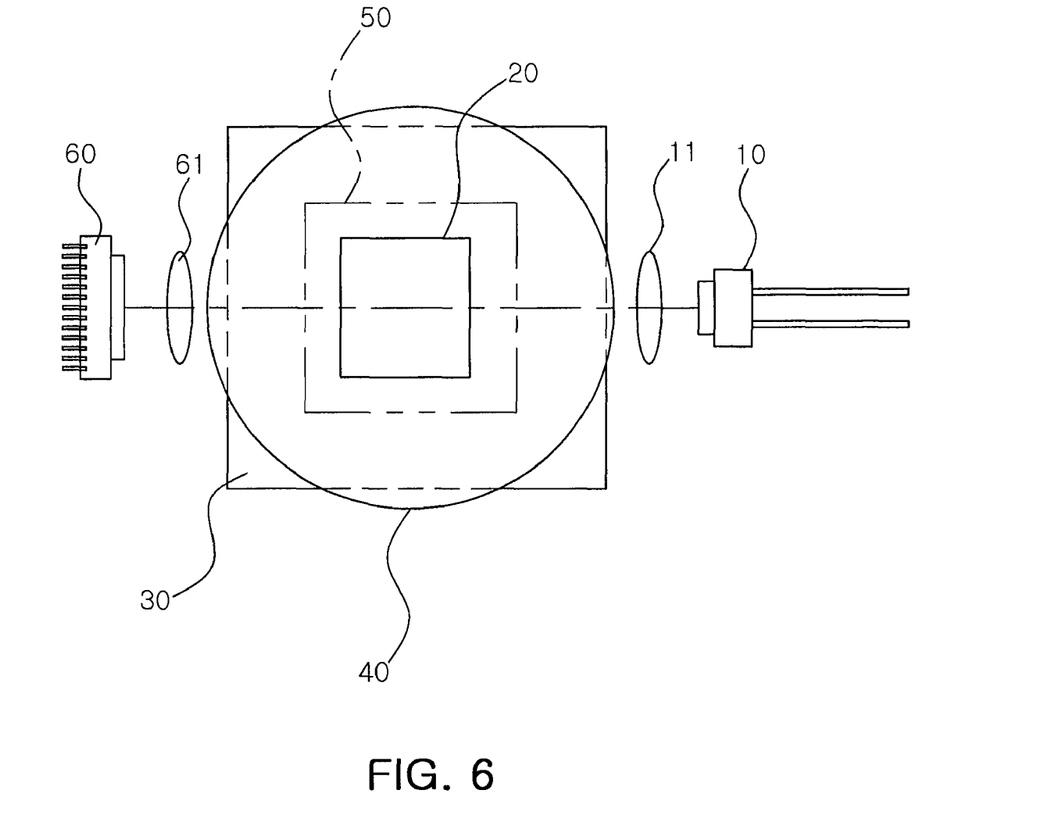
FIG. 6 is a plan view illustrating the distance measuring apparatus, shown in FIG. 4.

FIG. 4 is a perspective view schematically illustrating a distance measuring apparatus according to another exemplary embodiment of the invention. FIG. 5 is a cross-sectional view illustrating the distance measuring apparatus, shown in FIG. 4. FIG. 6 is a plan view illustrating the distance measuring apparatus, shown in FIG. 4.

Figure 7:
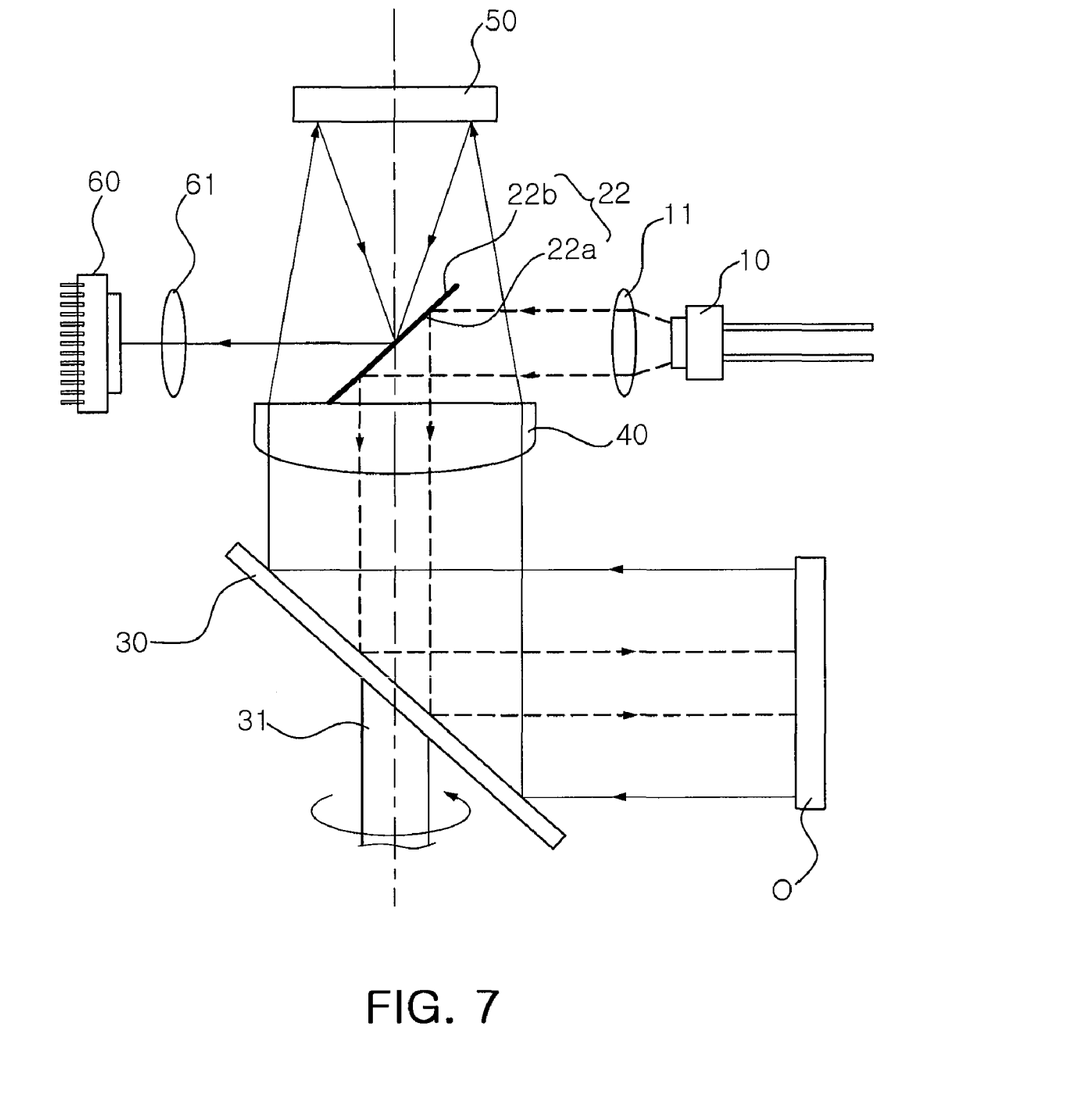
FIG. 7 is a cross-sectional view schematically illustrating a modification of the path switching unit of the distance measuring apparatus, shown in FIG. 4.
Figure 8:
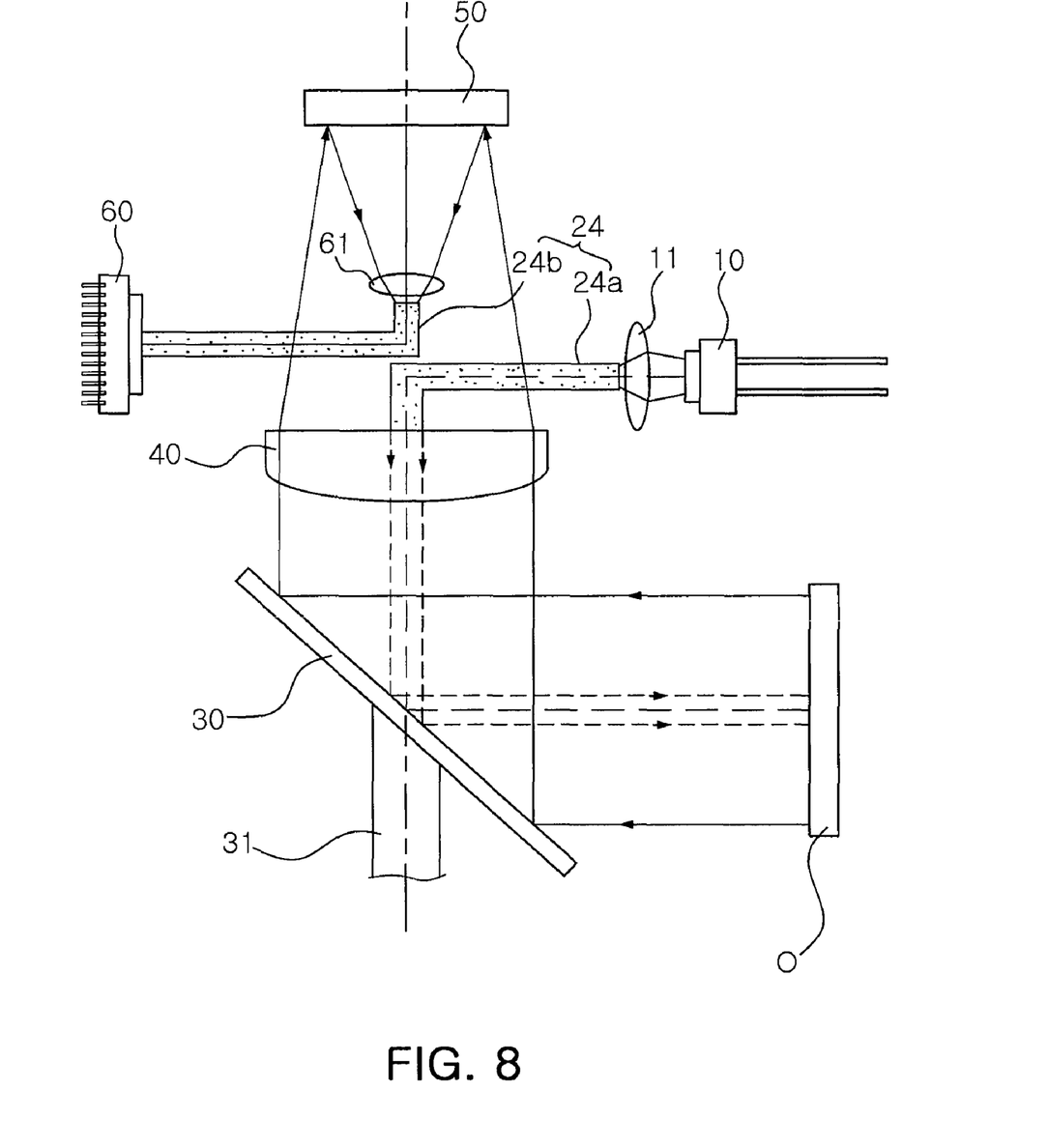
FIG. 8 is a cross-sectional view schematically illustrating another modification of the path switching unit the distance measuring apparatus, shown in FIG. 4.

FIG. 7 is a cross-sectional view schematically illustrating another example of the path switching unit of the distance measuring apparatus, shown in FIG. 4. FIG. 8 is a cross-sectional view schematically illustrating another example of the path switching unit of the distance measuring apparatus, shown in FIG. 4.

Referring to FIGS. 4 through 8, the distance measuring apparatus according to this embodiment may include a light source 10, an optical sensor 60, an upper reflective mirror 50, a sensor lens 40 and a lower reflective mirror 30 like the embodiment, illustrated with reference to FIGS. 1 through 3.

In the drawings, the functions and arrangements of the upper reflective mirror 50, the sensor lens 40 and the lower reflective mirror 30 are the same as those of the embodiment, illustrated in FIGS. 1 through 3, except that the light source 10 and the optical sensor 60 are disposed along different optical axes.

That is, the light source 10 and the optical sensor 60 face each other on the basis of an optical path formed between the upper reflective mirror 50 and the lower reflective mirror 30. The optical axis between the light source 10 and the optical sensor 60 is orthogonal to the optical axis between the upper reflective mirror 50 and the lower reflective mirror 30.

Here, the optical paths of both of the optical axes need to be changed so that they can be aligned on the same optical axis. To this end, in this embodiment, a path switching unit 20 is further included.

As shown in the drawings, the path switching unit 20 is fixed on the upper surface of the sensor lens 40 along the optical axis, and is aligned on the same optical axis as the light source 10 and the optical sensor 60.

The path switching unit 20 switches the optical path of the reference light, emitted from the light source 10, to the optical axis direction of the lower reflective mirror 30, and switches the optical path of reflected light, reflected by the upper reflective mirror 50, to the direction of the optical sensor 60.

Therefore, the path switching unit 20 is aligned along the optical axis between the light source 10 and the optical sensor 60 and the optical axis between the upper reflective mirror 50 and the lower reflective mirror 30, and switches the optical path at a position where both of the optical axes are orthogonal to each other.

As shown in FIGS. 4 through 6, the path switching unit 20 may include a prism that has a reflective surface 21 that is inclined at an angle of 45 degrees to the upper surface of the sensor lens 40.

The reflective surface 21 has mirror surfaces 21a and 21b at both sides thereof. The inner mirror surface 21a reflects the reference light, emitted from the light source, to the lower reflective mirror 30. The outer mirror surface 21b reflects reflected light, reflected by the upper reflective mirror 50, to the optical sensor 60.

Therefore, the inner mirror surface 21a of the reflective surface 21 switches the optical path of the reference light, emitted from the light source 10, from the horizontal direction to the vertical direction. As a result, the reference light moves toward the lower reflective mirror 30.

The outer mirror surface 21b of the reflective surface 21 switches the optical path of the reflected light, reflected by the upper reflective mirror 50, from the vertical direction to the horizontal direction. As a result, the reflected light is focused onto the optical sensor 60.

That is, the upper reflective mirror 50 limits the optical path of the reflected light to the space between the lower reflective mirror 30 and the upper reflective mirror 50, which corresponds to a distance L1. However, the reflected light moves back and forth along the optical path corresponding to a distance L2 between the upper reflective mirror 50 and the path switching unit 20.

Therefore, the reflected light moves through a distance corresponding to L1+L2+L3 that is obtained by adding L1+L2 corresponding to the optical path in the vertical direction and L3 corresponding to the optical path (between the optical switching unit and the optical sensor) in the horizontal direction, so that a distance large enough to focus light in order to process an optical signal can be ensured.

Here, both of the mirror surfaces 21a and 21b of the reflective surface 21 may be coated with metals, such as silver, gold and aluminum, or dielectric materials.

The prism may be stably secured to the upper surface of the sensor lens 40 using an adhesive (not shown) and facilitates optical alignment.

As shown in FIG. 7, an optical switching unit 22 may include a two-way mirror that has mirror surfaces 22a and 22b at both sides thereof. The optical switching unit 22 may be inclined at a predetermined slope with respect to the upper surface of the sensor lens 40.

As in the prism, while the mirror surface 22a of the two-way mirror reflects reference light, emitted from the light source 10, to the lower reflective mirror 30, the mirror surface 22b thereof reflects back reflected light, reflected by the upper reflective mirror 50, to the optical sensor 60.

As shown in FIG. 8, a path switching unit 24 may include a pair of optical fibers 24a and 24b that guide reference light, emitted from the light source 10, toward the lower reflective mirror 30 and reflected light, reflected by the upper reflective mirror 50, toward the optical sensor 60.

Here, the light source 10 and the optical sensor 60 do not have to be aligned along the same optical axis, and can be disposed at different positions. Therefore, the design of the distance measuring apparatus can be easily altered, and the size of the distance measuring apparatus can be easily reduced.

As such, when the light source 10 and the optical sensor 60 are not aligned along the same optical axis as the optical path in the longitudinal direction but are orthogonal to the optical axis of the optical path in the traverse direction, the optical path can be further reduced in length, thereby reducing the size of the distance measuring apparatus.

As set forth above, according to exemplary embodiments of the invention, a distance measuring apparatus can reduce the size thereof through a configuration in which reflected light moves back and forth in limited space of an optical path by shifting the optical path of the reflected light.

While the present invention has been shown and described in connection with the exemplary embodiments, it will be apparent to those skilled in the art that modifications and variations can be made without departing from the spirit and scope of the invention as defined by the appended claims.

What is claimed is:

1. A distance measuring apparatus comprising:
   a light source irradiating a reference light to measure a distance;
   a lower reflective mirror reflecting the reference light to irradiate the reference light onto a peripheral obstacle, and reflecting a reflected light, which is the reference light rebounded from the obstacle, so that the reflected light moves in an opposite direction along the same optical path as the reference light;
   a sensor lens arranged between the light source and the lower reflective mirror, and converting the reference light into parallel light beams and focusing the reflected light;
   an upper reflective mirror arranged above the light source and switching an optical path of the reflected light; and
   an optical sensor arranged between the light source and the upper reflective mirror, and receiving the reflected light having the optical path thereof switched by the upper reflective mirror,
   wherein the upper reflective mirror reflects back the reflected light, focused after passing through the sensor lens, in an opposite direction to a moving direction thereof so that a focus of the reflected light is formed between the lower reflective mirror and the upper reflective mirror.

2. The distance measuring apparatus of claim 1, wherein the upper reflective mirror, the sensor lens and the lower reflective mirror are aligned along the same optical axis as the reference light and the reflected light.

3. The distance measuring apparatus of claim 1, wherein the light source and the optical sensor are located between the sensor lens and the upper reflective mirror and are aligned along the same optical axis as the upper reflective mirror and the sensor lens.

4. The distance measuring apparatus of claim 2, wherein the light source and the optical sensor are located between the sensor lens and the upper reflective mirror and are aligned along the same optical axis as the upper reflective mirror and the sensor lens.

5. The distance measuring apparatus of claim 3, wherein the optical sensor is located, at a position where the reflected light is focused, along the optical path.

6. The distance measuring apparatus of claim 4, wherein the optical sensor is located, at a position where the reflected light is focused, along the optical path.

7. The distance measuring apparatus of claim 1, wherein the light source and the optical sensor face each other on the basis of the optical path so that a first optical axis between the light source and the optical sensor is orthogonal to a second optical axis between the lower reflective mirror and the upper reflective mirror.

8. The distance measuring apparatus of claim 7, further comprising a path switching unit switching the optical path of the reference light, emitted from the light source, toward the second optical axis and switching the optical path of the reflected light, reflected by the upper reflective mirror, toward the optical sensor.

9. The distance measuring apparatus of claim 8, wherein the path switching unit is secured to an upper surface of the sensor lens along the optical axis and is aligned along the same optical axis as the light source and the optical sensor.

10. The distance measuring apparatus of claim 8, wherein the path switching unit comprises a prism having a reflective surface inclined to the upper surface of the sensor lens.

11. The distance measuring apparatus of claim 10, wherein the reflective surface comprises an inner mirror surface reflecting the reference light, emitted from the light source, to the lower reflective mirror and an outer mirror surface reflecting reflected light, reflected by the upper reflective mirror, to the optical sensor.

12. The distance measuring apparatus of claim 8, wherein the path switching unit comprises a two-way mirror having mirror surfaces on both sides thereof, and is inclined at a predetermined slope with respect to the upper surface of the sensor lens.

13. The distance measuring apparatus of claim 12, wherein the two-way mirror comprises one surface reflecting the reference light, emitted from the light source, to the lower reflective mirror, and the other surface reflecting the reflected light, reflected by the upper reflective mirror, to the optical sensor.

14. The distance measuring apparatus of claim 8, wherein the path switching unit comprises a pair of optical fibers guiding the reference light, emitted from the light source, toward the lower reflective mirror and guiding the reflected light, reflected by the upper reflective mirror, toward the optical sensor.

15. The distance measuring apparatus of claim 1, wherein the lower reflective mirror rotates on a rotary shaft and tilts in connection with the rotary shaft by a hinge.

* * * * *